United States Patent
Har et al.

(10) Patent No.: US 7,519,643 B2
(45) Date of Patent: Apr. 14, 2009

(54) MONTGOMERY MULTIPLIER FOR RSA SECURITY MODULE

(75) Inventors: Dong-Soo Har, Gwangju (KR);
Dong-Wook Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 819 days.

(21) Appl. No.: 11/025,408

(22) Filed: Dec. 29, 2004

(65) Prior Publication Data

US 2006/0069710 A1      Mar. 30, 2006

(30) Foreign Application Priority Data

Sep. 24, 2004    (KR) ................ 10-2004-0076770

(51) Int. Cl.
*G06F 7/38* (2006.01)
*G06F 7/52* (2006.01)

(52) U.S. Cl. ...................... 708/491; 708/620

(58) Field of Classification Search ......... 708/491–492, 708/620
See application file for complete search history.

(56) References Cited

U.S. PATENT DOCUMENTS

| | | | |
|---|---|---|---|
| 5,719,803 A * | 2/1998 | Naffziger ............ 708/710 |
| 6,785,703 B2 * | 8/2004 | Bradley et al. ............ 708/702 |
| 6,963,645 B2 * | 11/2005 | Chen et al. ............ 708/491 |
| 2002/0194237 A1 * | 12/2002 | Takahashi et al. ......... 708/491 |
| 2003/0182340 A1 * | 9/2003 | Horie ................... 708/491 |
| 2004/0252829 A1 * | 12/2004 | Son ..................... 708/491 |
| 2004/0260741 A1 * | 12/2004 | Plessier ................. 708/492 |
| 2005/0165875 A1 * | 7/2005 | Mukaida et al. ......... 708/492 |
| 2007/0233769 A1 * | 10/2007 | Moshier et al. .......... 708/491 |

* cited by examiner

Primary Examiner—Chat C. Do
(74) Attorney, Agent, or Firm—Ladas & Parry LLP

(57) ABSTRACT

A Montgomery multiplier for providing security of information used in smart cards from hacking by a differential power analysis attack by minimizing power consumption difference by the input data. More particularly, the Montgomery multiplier applies an asynchronous dual rail lines method wherein two lines DATAFALSE and DATATRUE are used to represent one binary data such that in order to represent binary data '0', a logical high signal is applied to the DATAFALSE line, and a logical low signal is applied to the DATATRUE line. Conversely, to represent binary data '1', a logical low signal is applied to the DATAFALSE line, and a logical high signal is applied to the DATATRUE line. That is, when the data is represented by the asynchronous dual rail lines method, whatever the binary data value is, the same number of logical high states and logical low states are generated. As a result, whatever binary data is to be operated, the power consumption difference of the circuit is minimized.

15 Claims, 14 Drawing Sheets

MONTGOMERY MULTIPLIER FOR RSA SECURITY MODULE

BACKGROUND OF THE INVENTION

1. Field of the Invention

The present invention relates to a Montgomery multiplier, and more particularly, a Montgomery multiplier for an RSA security module secured from a differential power analysis attack.

2. Description of the Background Art

With the rapid growth of the internet and the electronic commerce, smart cards have been widely used as personal authentication solutions for the electronic commerce such as internet banking, electronic cash, medical cards and traffic cards. Because they can safely store personal information, personal keys and personal certificates, necessity and demand for the smart cards are increasing drastically. Especially, different from general magnetic cards, the smart cards containing microprocessors and memory functions show excellent physical security and safely store personal information. In addition, the smart cards can be used as multifunctional cards including memory, operation and security functions.

Generally public key encryption is applied to the smart cards and the RSA algorithm suggested by R. L. Rivest, A. Shamir and L. Adleman in 1978 has been known as the representative public key encryption.

The RSA encryption algorithm is performed by modular operations based on integers over 1024 bits. Security of the RSA encryption algorithm results from difficulty of factorization in prime factors of large integer coefficients. The RSA encryption algorithm is briefly explained as follows. Two different decimals 'p' and 'q' are designated as personal keys. The product of 'p' and 'q' n(=pq) and an arbitrary integer 'e' that is relatively prime from $\phi(n)$ are designated as public keys. Here, $\phi(n)$ represents a number of elements relatively prime from 'n'. In addition, 'd' satisfying $e \cdot d = 1 \pmod{\phi(n)}$ is calculated and used as a personal key. That is, 'p', 'q' and 'd' are personal keys and 'n' and 'e' are public keys.

In encryption, a plain text M is calculated as an encrypt text $C = M^e \bmod n$ by using the public key 'e', and calculated as a decrypt text $M = C^d \bmod n$. As described above, the RSA security module performs encryption and decryption by taking modular exponentiation to the pubic or personal key. The modular exponentiation is consecutive modular multiplications and the modular multiplication is consecutive additions. Normally used is a Montgomery algorithm that does not have to consider carry delay in the operation. For example, a Montgomery multiplier actually performs $ABR^{-1} \bmod N$ instead to calculate $AB \bmod N$, wherein R is an integer relatively prime from N and larger than N.

However, side channel information that is not considered in encryption algorithm design for the smart cards exists. The side channel information is classified into time differential information showing time operation differences in an operation of a microprocessor, signal information leaked from a power line, mis-operation information caused by defect inputs, and information by electromagnetic leakage, and etc.

Smart card attack techniques by side channels are generally called side channel attacks, and divided into a time differential attack by time differential information, an defect input attack by defect mis-operation information, an electromagnetic leakage attack by the electromagnetic leakage information, and a power analysis attack by power line leakage information.

Here, the power analysis attack means a password decryption technique by which binary codes of various information is read by measuring instantaneous voltage (power) variations of an IC chip when an encryption algorithm and a secret key for encryption built in the card start to operate, and important information is analyzed according to a statistical method, and forged/modulated as well. The power analysis attack is classified into a simple power analysis attack, a differential power analysis attack, an inference power analysis attack and a high-degree differential power analysis attack. Especially, the differential power analysis attack can estimate the secret key merely by using a few devices for measuring voltage variations. Accordingly, the differential power analysis attack is deemed to be more efficient than a brute-force attack using an exclusive encryption device or a super computer.

FIGS. 1A and 1B are circuit diagrams illustrating a structure and operation of a synchronous XOR circuit generally applied to the Montgomery multiplier.

TABLE 1

| $A_{IN\_TRUE}$ | $B_{IN\_TRUE}$ | $OUT_{TRUE}$ |
|---|---|---|
| 0 | 0 | 0 |
| 0 | 1 | 1 |
| 1 | 0 | 1 |
| 1 | 1 | 0 |

Referring to FIG. 1A, an XOR gate 10 receives two input signals $A_{IN\_TRUE}$ and $B_{IN\_TRUE}$ as shown in Table 1. When the two input values are different, the XOR gate 10 outputs a logical high value, and when the two input values are identical, the XOR gate 10 outputs a logical low value.

In FIG. 1B, the gate-level synchronous XOR circuit of FIG. 1A is designed in a transistor level.

As illustrated in FIG. 1B, the synchronous XOR circuit includes the first P type transistor P101 and the first N type transistor N101 driven by the first input signal A1 and connected in series between a power supply node and a ground node, the second P type transistor P102 and the second N type transistor N102 driven by the voltage applied to the output node of the first P type transistor P101 and connected in series between the power supply node and the ground node, the third P type transistor P103 and the third N type transistor N103 driven by the second input signal A2 and connected in series between the power supply node and the ground node, the fourth P type transistor P104 driven by the voltage applied to the output node of the third P type transistor P103 and receiving the voltage applied to the output node of the second P type transistor P102, the fourth N type transistor N104 driven by the second input signal A2 and receiving the voltage applied to the output node of the second P type transistor P102, the fifth P type transistor P105 driven by the second input signal A2 and receiving the voltage applied to the output node of the first P type transistor P101, the fifth N type transistor P105 driven by the voltage applied to the output node of the third P type transistor P103 and receiving the voltage applied to the output node of the first P type transistor P101, and the sixth P type transistor P106 and the sixth N type transistor N106 driven by the voltage applied to the output node of the fourth P and N type transistors P104 and N104 and the output node of the fifth P and N type transistors P105 and N105, and connected in series between the power supply node and the ground node. The output node of the sixth P type transistor P106 outputs the final output value.

Still referring to FIG. 1B, when the output value $OUT_{TRUE}$ is low, five of the ten transistors are turned on, but when the output value $OUT_{TRUE}$ is high, three of them are turned on. That is, in the synchronous XOR circuit, the number of the switched transistors is changed according to the input values, and thus power consumption is changed. Such power difference makes the module weak to the differential power analysis attack.

Required is an operation logic for solving the problems of the synchronous XOR circuit applied to the Montgomery multiplier, and minimizing correlations between internally-operated binary data and power consumption patterns.

FIG. 2 shows a data representation method by a synchronous single line method and an asynchronous double line method.

By the synchronous single line method, the data is represented as logical high or low states according to binary data '0' or '1'. For example, as shown in FIG. 2, data '0100110' represents, three logical high states and four logical high states according to input of a clock signal.

On the other hand, by the asynchronous double line method, two lines $DATA_{FALSE}$ and $DATA_{TRUE}$ are used to represent one binary data. In order to represent binary data '0', a logical high signal is applied to the $DATA_{FALSE}$ line, and a logical low signal is applied to the $DATA_{TRUE}$ line. Conversely, to represent binary data '1', a logical low signal is applied to the $DATA_{FALSE}$ line, and a logical high signal is applied to the $DATA_{TRUE}$ line.

In the case that the data is represented by the asynchronous double line method, whatever the binary data value is, the same number of logical high states and logical low states are generated. Accordingly, whatever binary data is to be operated, power consumption difference of the circuit is minimized.

When the RSA security module is formed by using the aforementioned characteristics of the asynchronous double line method, the differential power analysis attack can be defended.

FIGS. 3A to 3C are circuit diagrams illustrating a structure and operation of an asynchronous XOR circuit.

As shown in FIG. 3A, all items that can be generated by two input binary data $A_{IN\_TRUE}$, $A_{IN\_FALSE}$, $B_{IN\_TRUE}$ and $B_{IN\_FALSE}$ are generated by C-element devices 20, 22, 24 and 26, and the outputs from the C-element devices 20, 22, 24 and 26 are combined by OR gates 30 and 32.

FIG. 3B is an exemplary diagram illustrating transistor-level design of the C-element devices 20, 22, 24 and 26 of FIG. 3A. The C-element device 20 includes the first to the fifth P type transistors P201, P202, P203, P204 and P205, and the first to the fifth N type transistors N201, N202, N203, N204 and N205. FIG. 3C is an exemplary diagram illustrating transistor-level design of the OR gates 30 and 32 of FIG. 3A. The OR gate 30 is driven by the output signals C1 and C2 from the two C-element devices 20 and 22, and includes the first to the third P type transistors P301, P302 and P303 and the first to the third N type transistors N301, N302 and N303.

In the asynchronous XOR circuit, the number of the switched transistors is not changed according to the input values. However, since excessively many C-element devices are used, large space for the circuit is needed.

SUMMARY OF THE INVENTION

The present invention is achieved to solve the above problems. Accordingly, it is an object of the present invention to provide a Montgomery multiplier which is secured from a differential power analysis attack and to reduce the size in design of an RSA security module.

In order to achieve the above-described object of the invention, there is provided a Montgomery multiplier for an RSA security module, including: the first filtering means for receiving the first input signal and the second input signal represented by an asynchronous double line method, and selectively outputting the second input signal according to a logical value of the first input signal; the first carry save adder for outputting a sum and a carry of double line method by adding up a carry signal and a sum signal generated in a previous calculation procedure and the output signal from the first filtering means; the second filtering means for receiving a logical value of a least significant sum of the first carry save adder as the third input signal and a modular operation factor as the fourth signal, and filtering the fourth input signal according to the third input signal; the second carry save adder for generating a sum and a carry of double line method, by adding up the carry and the sum outputted from the first carry save adder and the output from the second filtering means; a carry storing means and a sum storing means for storing the carry and the sum from the second carry save adder; a carry propagation adder for calculating the final result by adding up the data stored in the carry storing means and the sum storing means; and an operation completion sensing means for deciding operation completion according to the output signal from the second carry save adder.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A Montgomery multiplier for an RSA security module in accordance with a preferred embodiment of the present invention will now be described in detail with reference to the accompanying drawings.

Figure 1A:
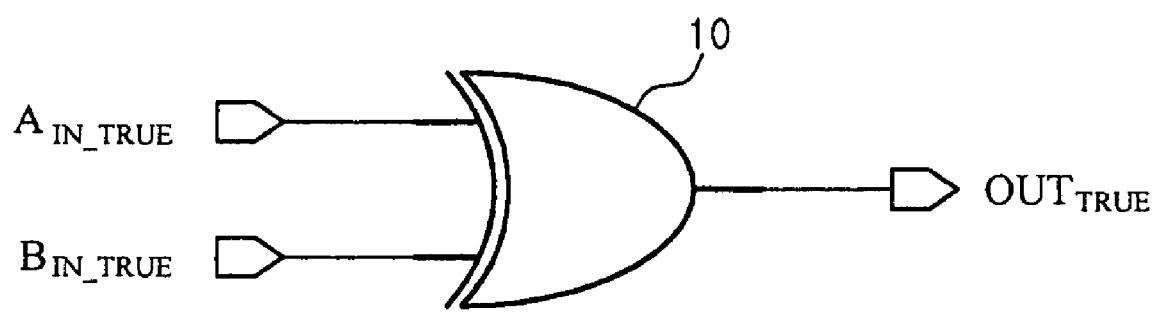
FIGS. 1A and 1B are circuit diagrams illustrating a structure and operation of a synchronous XOR circuit.
Figure 1B:
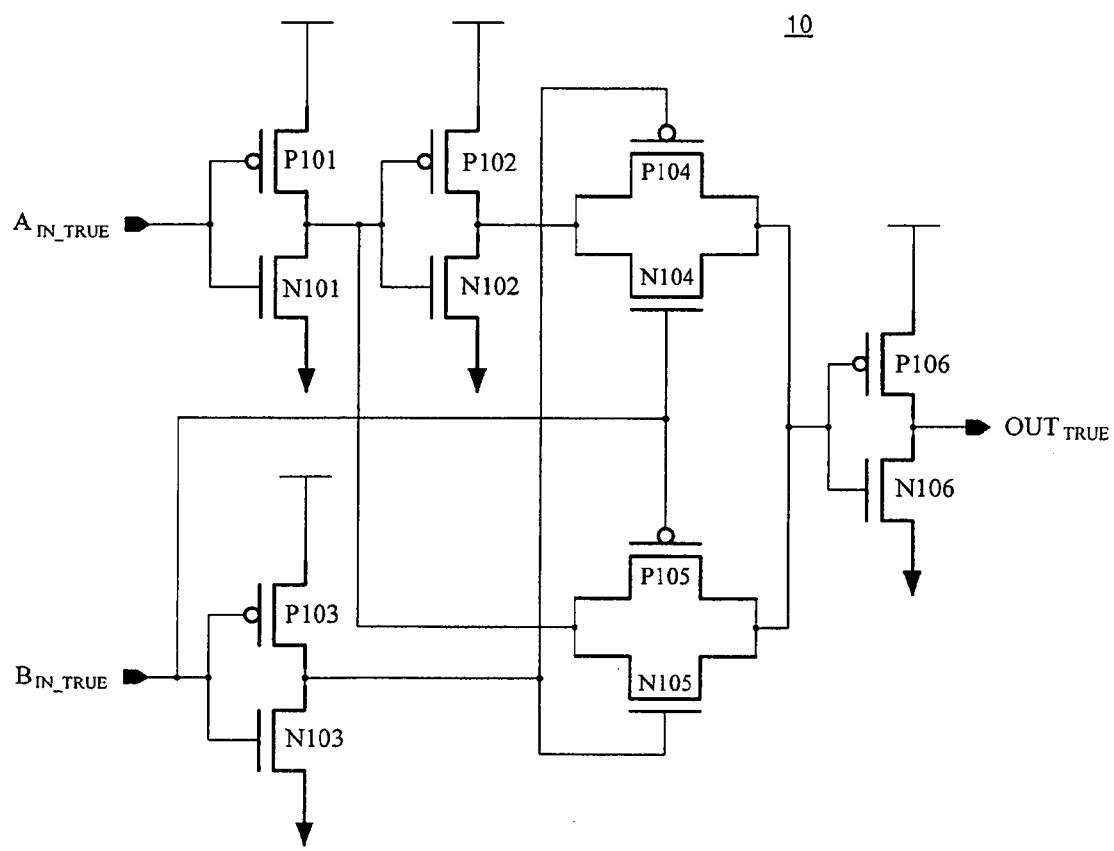
Figure 2:
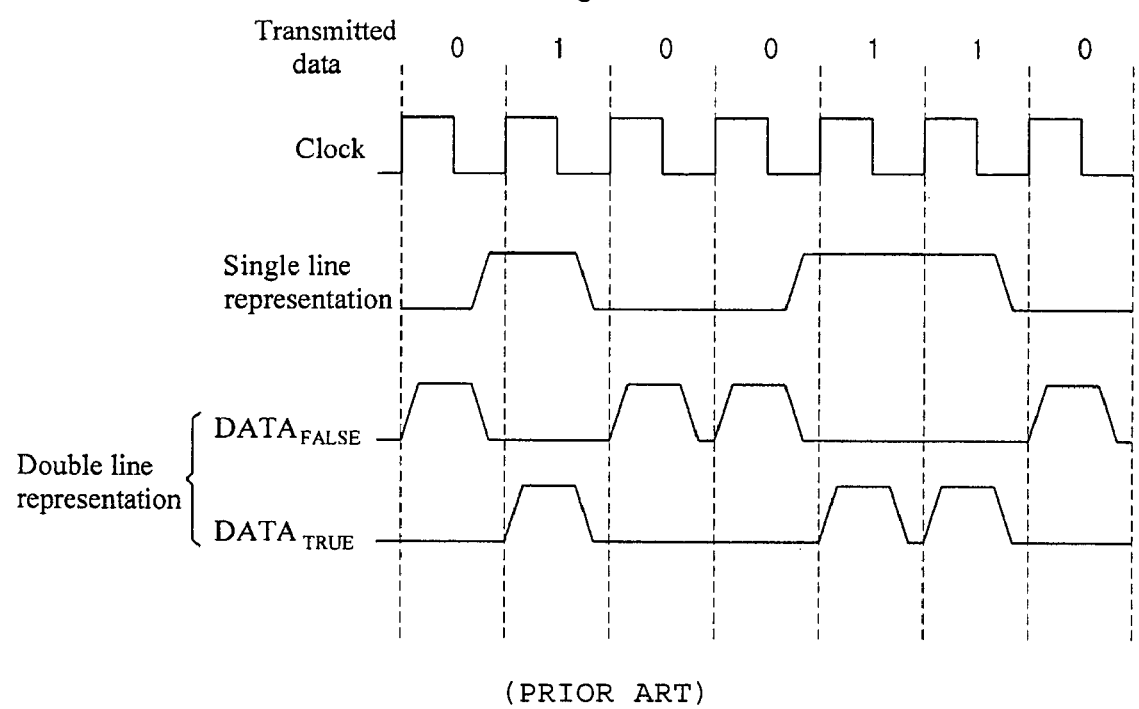
FIG. 2 is an exemplary diagram illustrating a data representation method by a synchronous single line method and an asynchronous double line method.
Figure 3A:
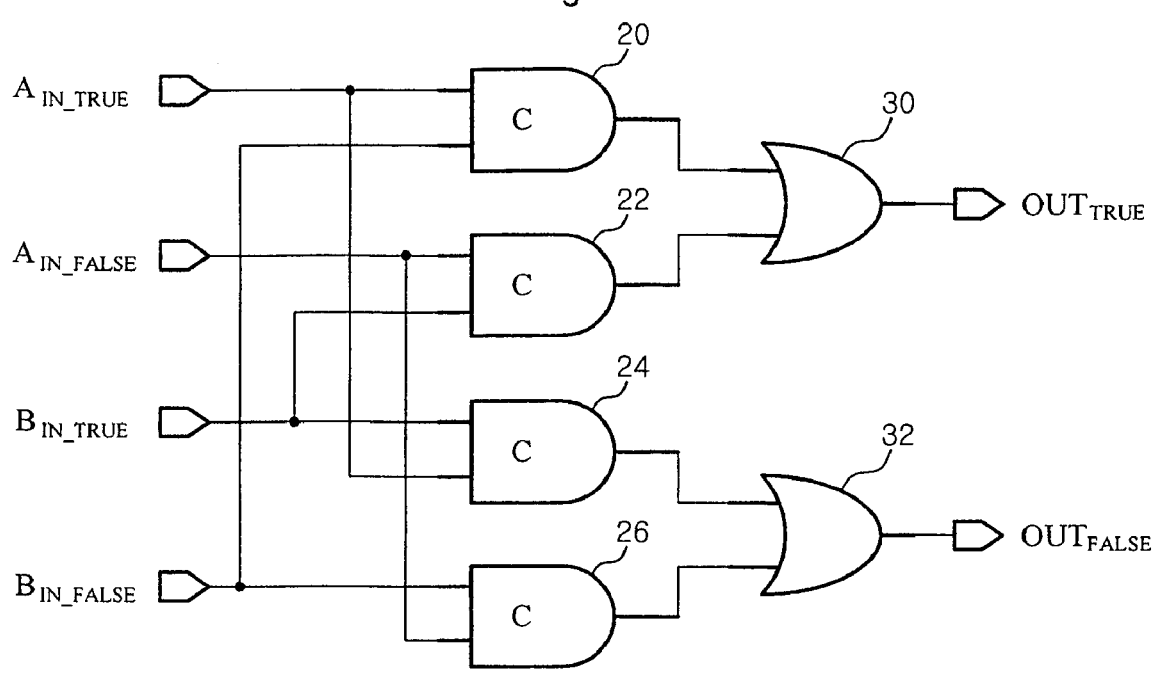
FIGS. 3A to 3C are circuit diagrams illustrating a structure and operation of an asynchronous XOR circuit.
Figure 3B:
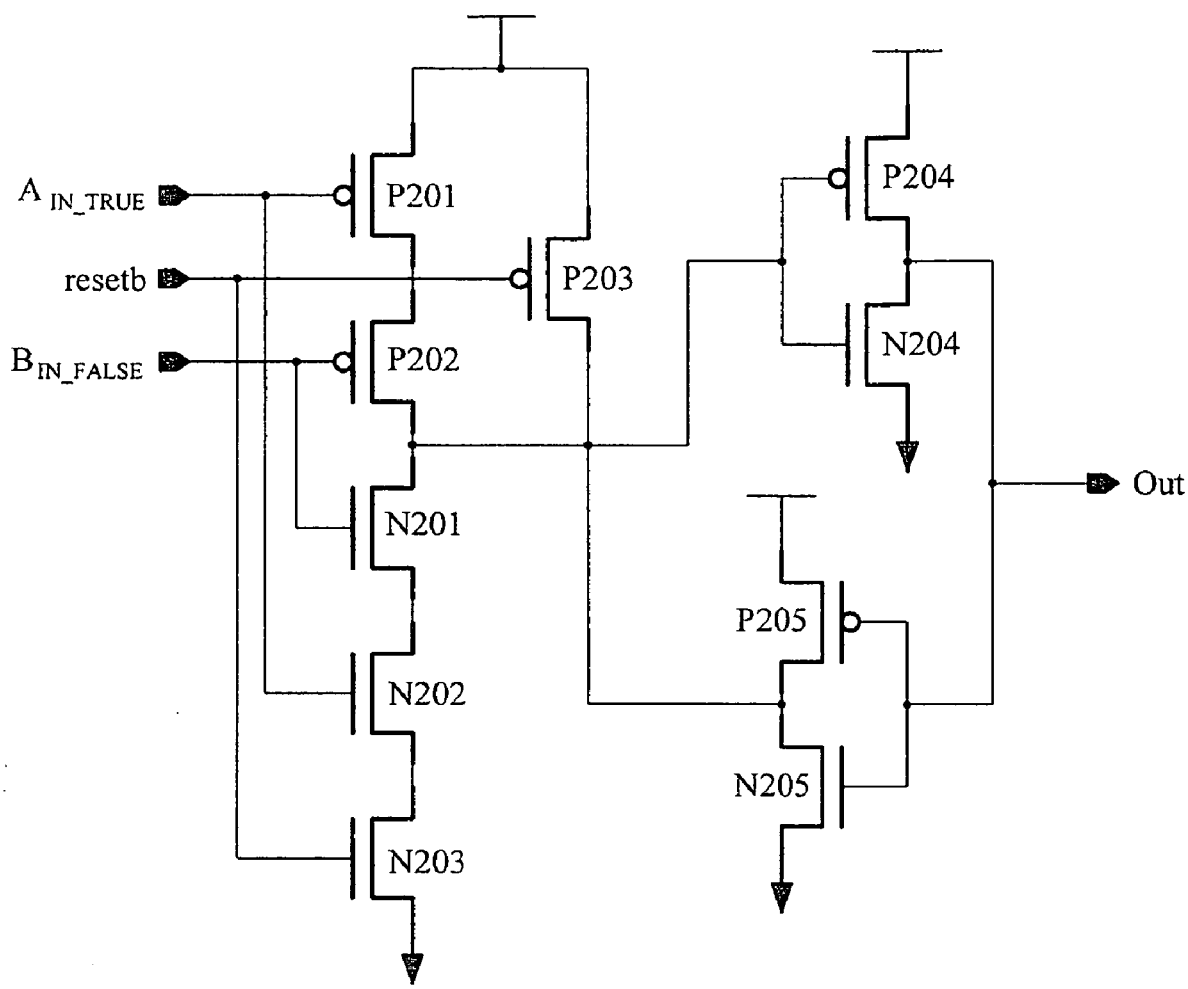
Figure 3C:
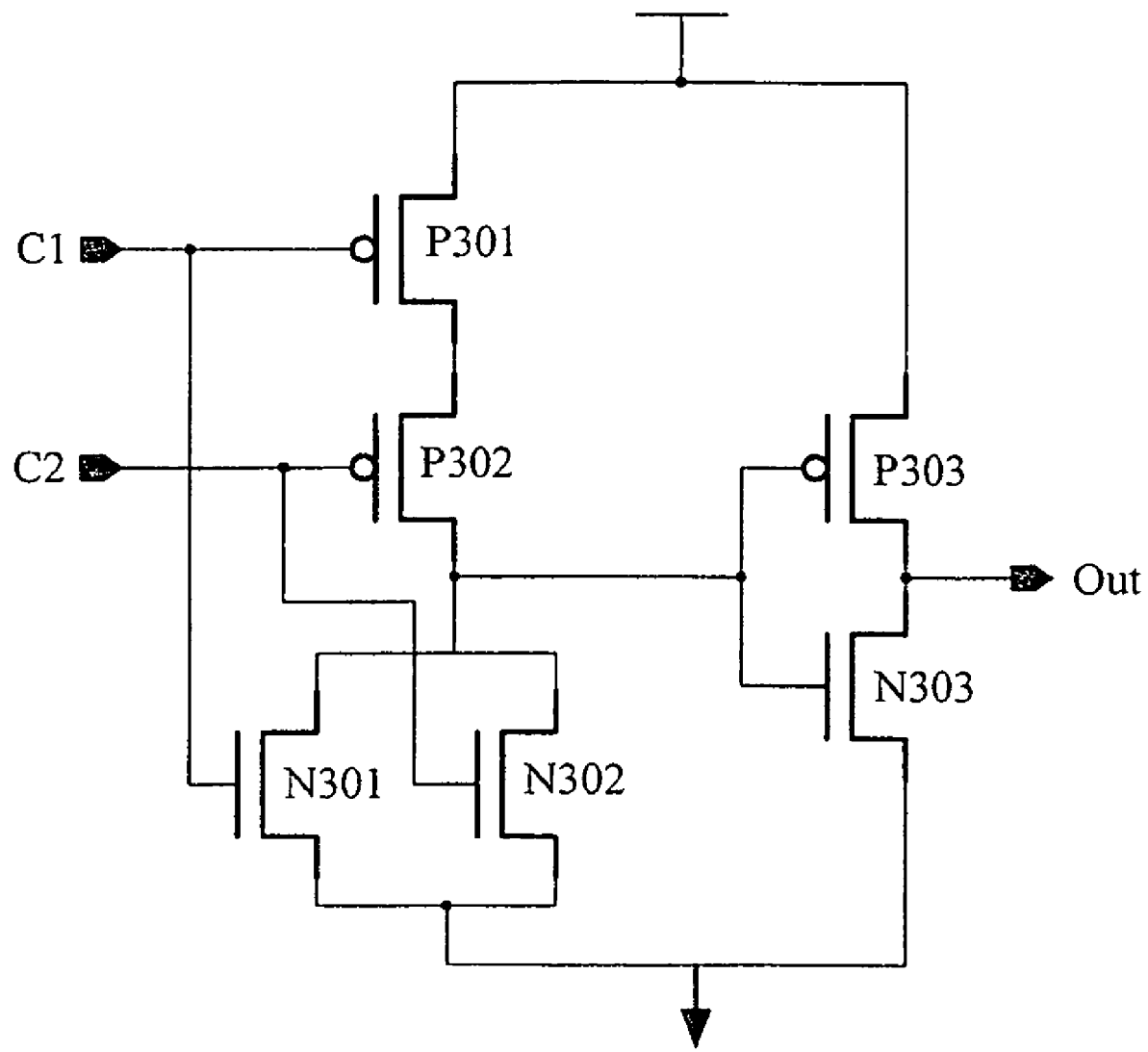
Figure 4:
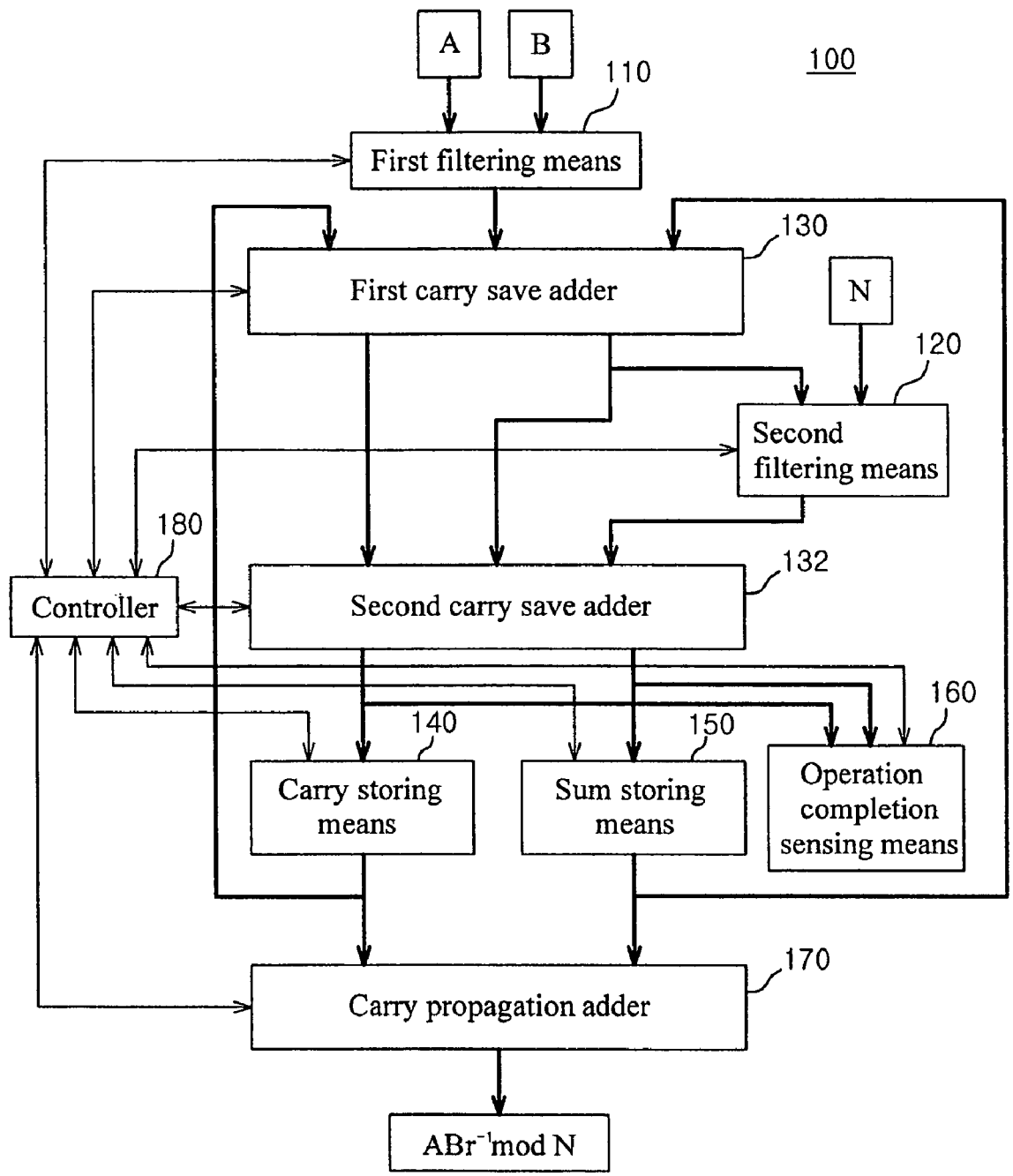
FIG. 4 is a circuit diagram illustrating a structure of a Montgomery multiplier in accordance with the present invention.

FIG. 4 is a circuit diagram illustrating the structure of the Montgomery multiplier in accordance with the present invention. The Montgomery multiplier actually performs $ABR^{-1}$ mod N instead to calculate AB mod N. wherein R is an integer relatively prime from N and larger than N.

The Montgomery multiplier 100 includes the first filtering means 110 for receiving the first input signal A and the second input signal B, and selectively outputting the second input signal B according to a logical value of the first input signal A, the first carry save adder 130 for outputting a sum and a carry of double line method by adding up a carry signal generated in a previous calculation procedure, the output signal from the first filtering means 110 and a sum signal generated in a previous calculation procedure, the second filtering means 120 for receiving a logical value of a least significant sum of the first carry save adder 130 as the first input signal and a modular operation factor N as the second input signal, and filtering the second input signal that is the modular operation factor N according to the first input signal, the second carry save adder 132 for generating a sum and a carry of double line method, by adding up the carry and the sum from the first carry save adder 130 and the output from the second filtering means 120, a carry storing means 140 and a sum storing means 150 for storing the carry and the sum from the second carry save adder 132, a carry propagation adder 170 for calculating the final result by adding up the data stored in the carry storing means 140 and the sum storing means 150, an operation completion sensing means 160 for deciding operation completion, and a controller 180 for controlling the whole operation.

When the logical value of the first input signal A is '1' ('10' in double line representation), the first filtering means 110 outputs the second input signal B as the resultant value, when the logical value of the first input signal A is '0' ('01' in double line representation), the first filtering means 110 outputs logical 0 ('01' in double line representation), and when the logical value of the first input signal A does not exist (NO DATA), the first filtering means 110 outputs logical NO DATA regardless of the second input signal B. The second filtering means 120 receives the least significant data of the first carry save adder 130 as the first input signal and the modular operation factor N as the second signal, and operates in the same manner as the first filtering means 110.

Figure 5A:
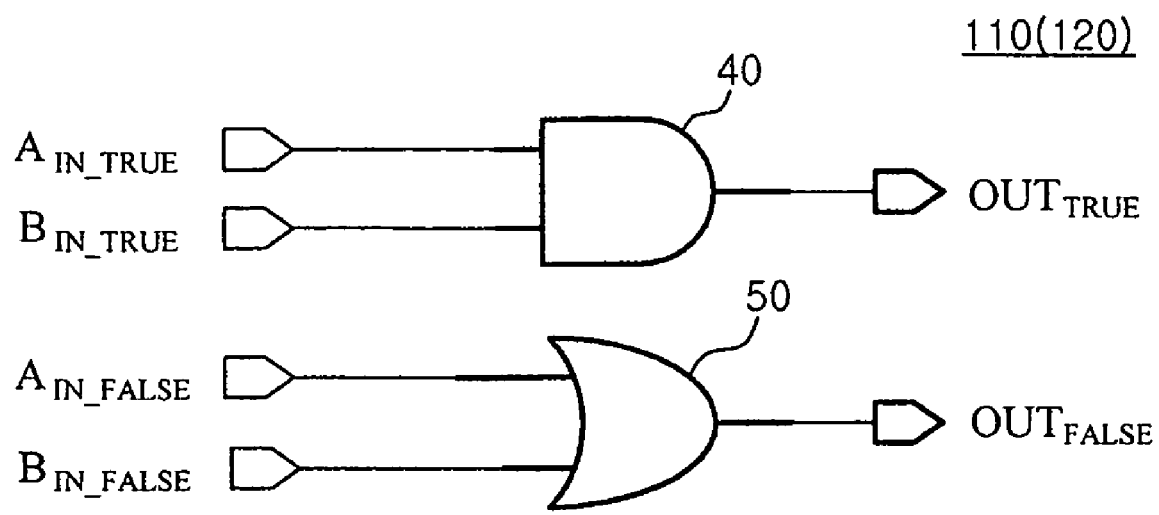
FIGS. 5A to 5C are circuit diagrams illustrating a structure and operation of a filtering means in accordance with the present invention.
Figure 5B:
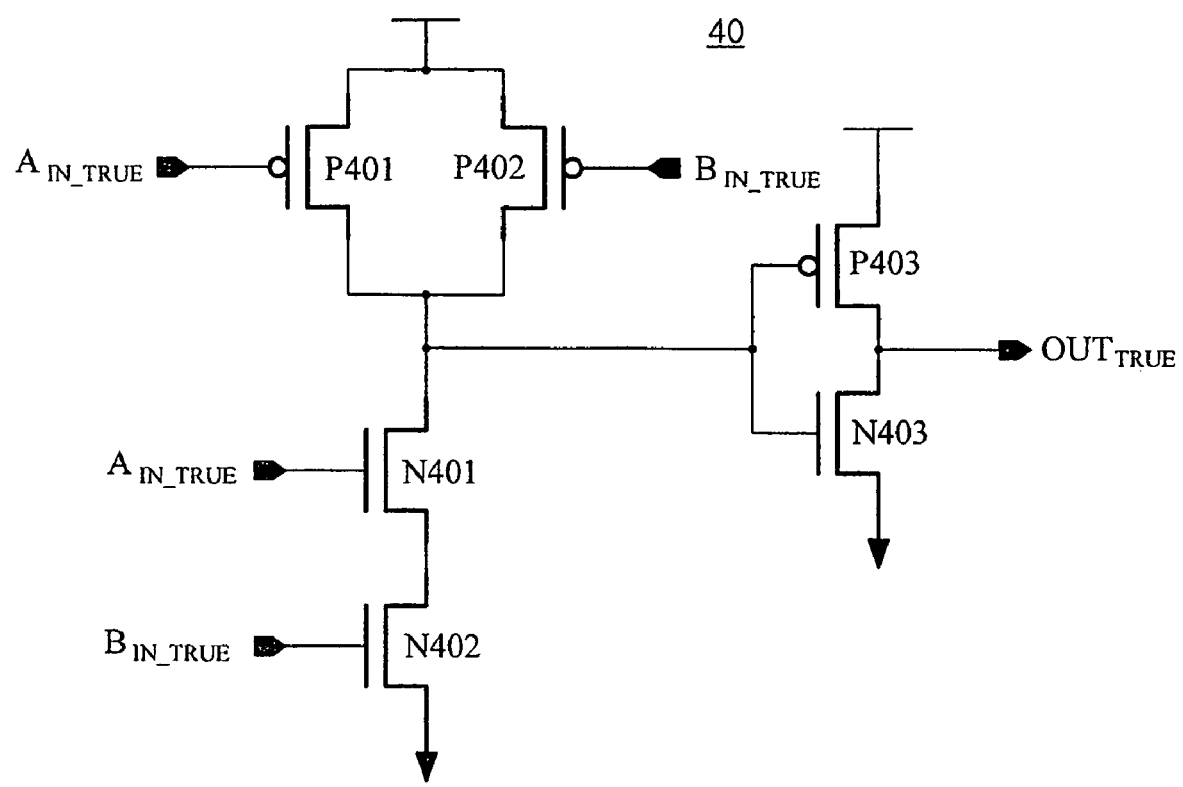
Figure 5C:
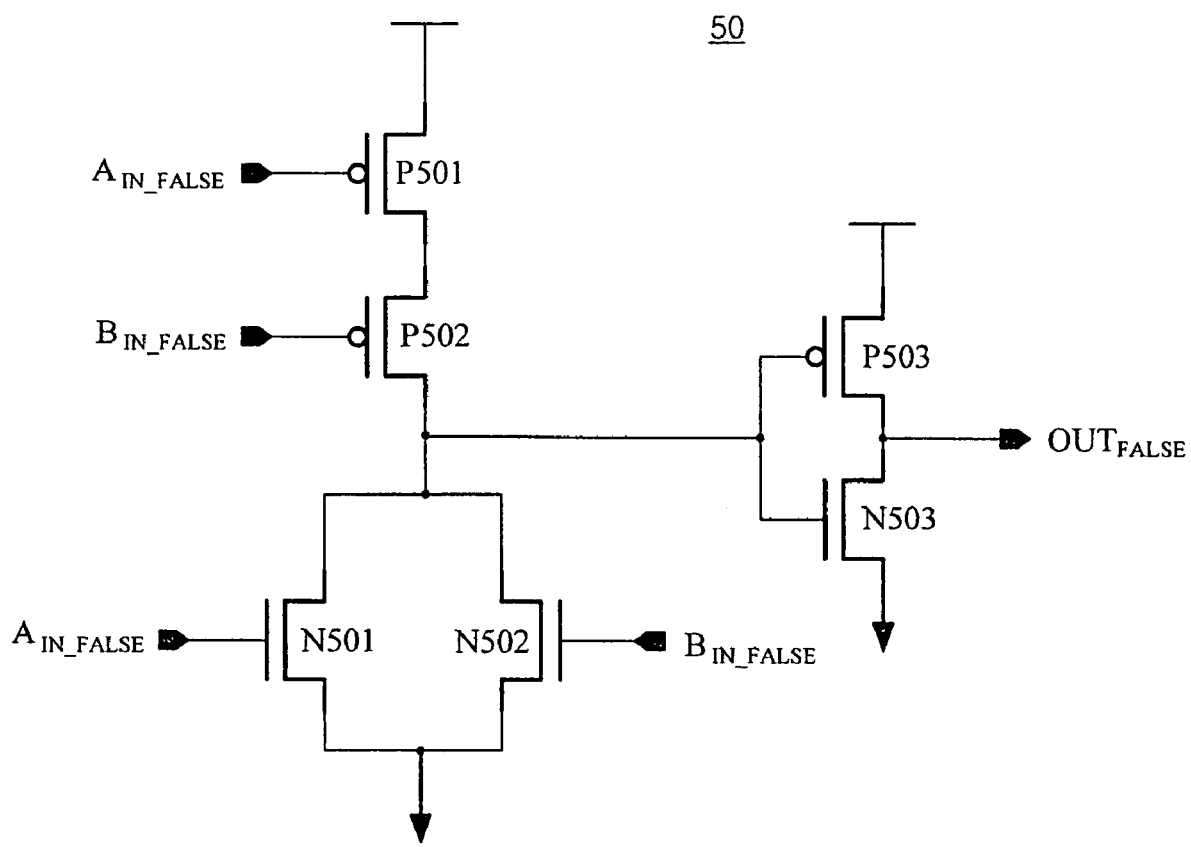

FIGS. 5A to 5C are circuit diagrams illustrating the structure and operation of the filtering means in accordance with the present invention.

As illustrated in FIG. 5A, each of the filtering means 110 and 120 includes the first logical element 40 for outputting a high signal only when two binary data $A_{IN\_TRUE}$ and $B_{IN\_TRUE}$ inputted to a $DATA_{TRUE}$ line are logical high, and the second logical element 50 for outputting a low signal only when two binary data $A_{IN\_FALSE}$ and $B_{IN\_FALSE}$ inputted to a $DATA_{FALSE}$ line are logical low. Here, the first logical element 40 can be comprised of an AND gate and the second logical element 50 can be comprised of an OR gate.

In FIG. 5B, the first logical element 40 of FIG. 5A is designed in a transistor level. The first logical element 40 includes the first and the second P type transistors P401 and P402 connected in parallel to a power supply node and driven by the first input signal A1 and the second input signal B1, respectively, the first and the second N type transistors N401 and N402 connected in series between the output node of the first and the second P type transistors P401 and P402 and a ground node, and driven by the first input signal A1 and the second input signal B1, respectively, and the third P type transistor P403 and the third N type transistor N403 driven by the voltage applied to the output node of the first and the second P type transistors P401 and P402, and connected in series between the power supply node and the ground node. The voltage applied to the output node of the third P type transistor P403 becomes the output signal from the whole circuit.

In the transistor-level circuit of the first logical element 40 of FIG. 5B, when the two input signals A1 and B1 are '0' and '1' respectively, the first P type transistor P401, the second N type transistor N402 and the third N type transistor N403 are turned on, and the other three transistors P402, N401 and P403 are turned off. In addition, when the two input signals A1 and B1 are '1' and '1', the first N type transistor N401, the second N type transistor N402 and the third P type transistor P403 are turned on, and the other three transistors P401, P402 and N403 are turned off. That is, the number of the switched transistors is not influenced by the input signals.

In FIG. 5C, the second logical element 50 of FIG. 5A is designed in a transistor level. The second logical element 50 includes the fourth P type transistor P501 connected to a power supply node and driven by the third input signal A2 and the fourth input signal B2, the fifth P type transistor P502 connected in series to the fourth P type transistor P501, the fourth and the fifth N type transistors N501 and N502 connected in parallel between the fifth P type transistor P502 and a ground node and driven by the third input signal A2 and the fourth input signal B2, respectively, and the sixth P type transistor P503 and the sixth N type transistor N503 driven by the voltage applied to the output node of the fifth P type transistor P502 and connected in series between the power supply node and the ground node. The voltage applied to the output node of the sixth P type transistor P503 becomes the output signal of the whole circuit.

In the transistor-level circuit of the second logical element 50, when the two input signals A2 and B2 are '0' and '1' respectively, the fourth P type transistor P501, the fifth N type transistor N502 and the sixth P type transistor P503 are turned on, and the other transistors P502, N501 and N503 are turned off. In addition, when the two input signals A2 and B2 are '1' and '1', the fourth N type transistor N501, the fifth N type transistor N502 and the sixth P type transistor P503 are turned on, and the other transistors P501, P502 and N503 are turned off. That is, the number of the switched transistors is not influenced by the input signals.

The operation of the filtering means 110 and 120 of FIG. 5A will now be explained.

In accordance with the asynchronous double line method, logical data '0' is represented as '01', and logical data '1' is represented as '10'. Table 2 shows the output values of the filtering means 110 and 120 in regard to the two input binary data (actually, four data).

TABLE 2

| | | A | | |
|---|---|---|---|---|
| | | 00 (logical NO DATA) | 01 (logical 0) | 10 (logical 1) |
| B | 00 (logical NO DATA) | 00 | 00 | 00 |
| | 01 (logical data 0) | 00 | 01 | 01 |
| | 10 (logical data 1) | 00 | 01 | 10 |

Referring to FIG. 5A, when two logical data '01' are inputted, namely, when $A_{IN\_TRUE}$ is '0', $A_{IN\_FALSE}$ is '1', $B_{IN\_TRUE}$ is '1' and $B_{IN\_FALSE}$ is '0', the output signal $OUT_{TRUE}$ from the first logical element 40 is '0' and the output signal $OUT_{FALSE}$ from the second logical element 50 is '1'. That is, the logical data '0' is outputted. In addition, when two logical data '11' are inputted, namely, when $A_{IN\_TRUE}$ is '1', $A_{IN\_FALSE}$ is '0', $B_{IN\_TRUE}$ is '1' and $B_{IN\_FALSE}$ is '0', the output signal $OUT_{TRUE}$ from the first logical element 40 is '1' and the output signal $OUT_{FALSE}$ from the second logical element 50 is '0'. That is, the logical data '1' is outputted.

As described above, when the first input signal A is logical '1', the filtering means 110 and 120 output the second input signal B as it is, and when the first input signal A is logical '0', the filtering means 110 and 120 output logical '0', and when the data is not inputted to the first input signal A (NO DATA), the filtering means 110 and 120 output logical NO DATA, thereby filtering and outputting the second input signal B.

The first and the second carry save adders 130 and 132 and the carry propagation adder 170 will now be described.

The first and the second carry save adders 130 and 132 and the carry propagation adder 170 can be comprised of full adders for adding up the two input binary data A and B and the carry signal Cin generated in the previous adding up procedure. The full adders are represented by the following formula 1:

Formula 1

(SUM)=(A XOR B) XOR Cin

CARRY=(A AND B) OR (A AND Cin) OR (B AND Cin)

The AND and OR operations required in formula 1 can be performed by the circuits of FIGS. 5B and 5C. FIG. 6 shows gate-level and transistor-level design for the XOR operation.

Figure 6A:
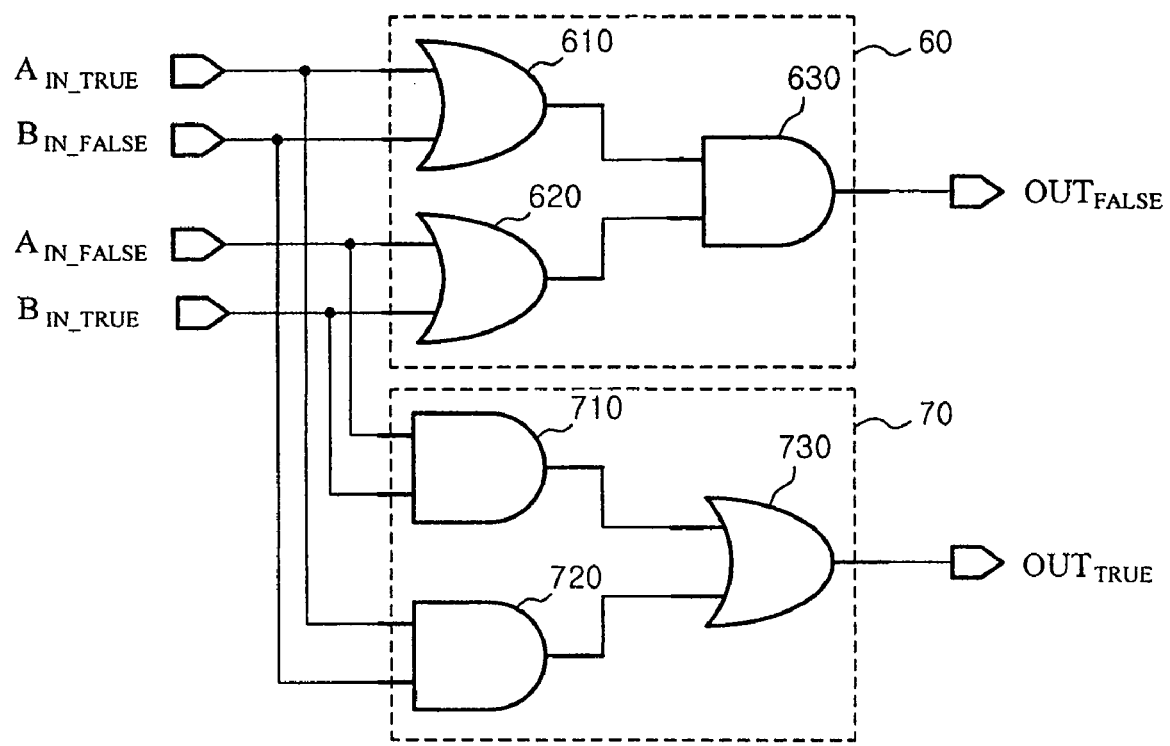
FIGS. 6A to 6C are circuit diagrams illustrating a structure and operation of an XOR circuit in accordance with the present invention.
Figure 6B:
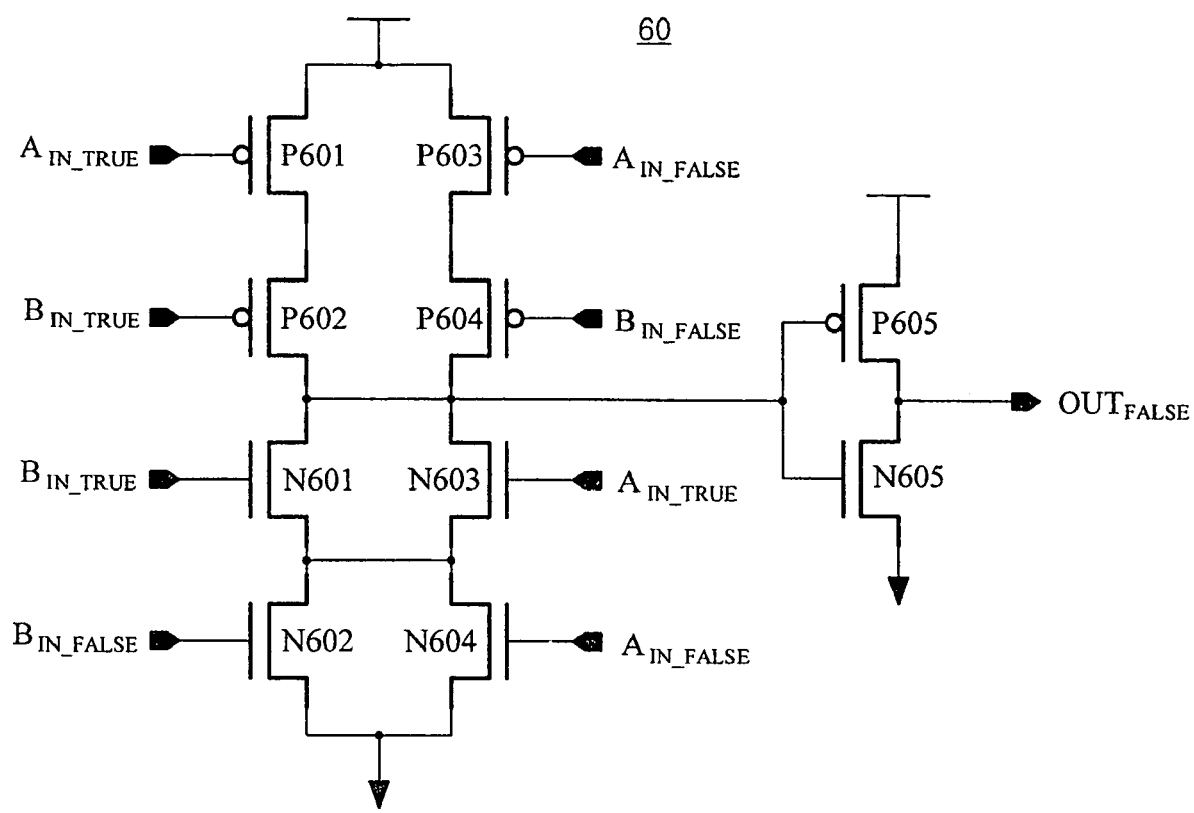
Figure 6C:
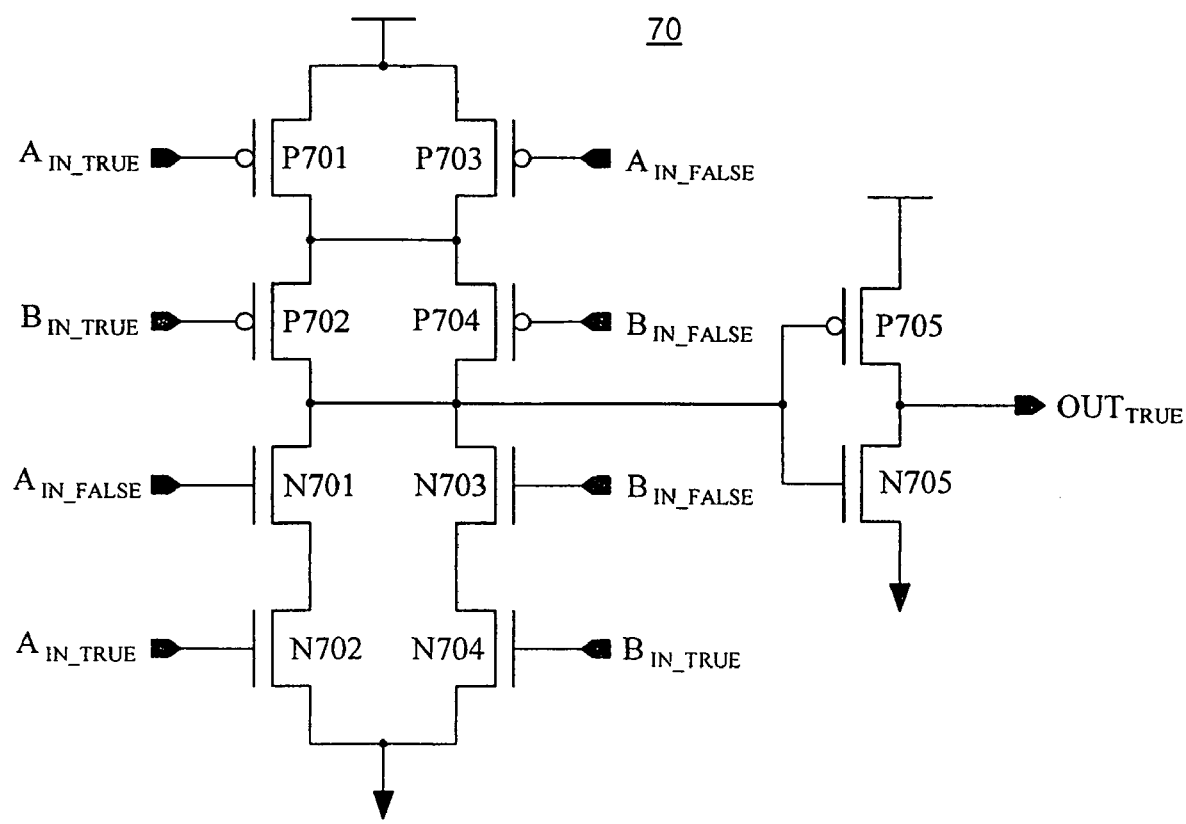

FIGS. 6A to 6C are circuit diagrams illustrating the structure and operation of the XOR circuit in accordance with the present invention.

As depicted in FIG. 6A, the XOR circuit includes the first operation unit 60 for receiving two binary signals (actually, four signals), and outputting '0' when the two binary signals are identical, and the second operation unit 70 for outputting '1' when the two binary signals are different.

The first operation unit 60 includes the third logical element 610 for receiving the TRUE signal $A_{IN\_TRUE}$ of the first input signals A and the FALSE signal $B_{IN\_FALSE}$ of the second input signals B, and outputting '0' when the two input signals are logical '0', the fourth logical element 620 for receiving the FALSE signal $A_{IN\_FALSE}$ of the first input signals A and the TRUE signal $B_{IN\_TRUE}$ of the second input signals B, and outputting '0' when the two input signals are logical '0', and the fifth logical element 630 for receiving the output signals from the third and the fourth logical elements 610 and 620, and outputting '1' when the input signals are '1'. Here, the output from the fifth logical element 630 becomes the FALSE output from the asynchronous double line method XOR circuit.

The second operation unit 70 includes the sixth logical element 710 for receiving the FALSE signal $A_{IN\_FALSE}$ of the first input signals A and the TRUE signal $B_{IN\_TRUE}$ of the second input signals B, and outputting '1' when the two input signals are logical '1', the seventh logical element 720 for receiving the TRUE signal $A_{IN\_TRUE}$ of the first input signals A and the FALSE signal $B_{IN\_FALSE}$ of the second input signals B, and outputting '1' when the two input signals are logical '1', and the eighth logical element 730 for receiving the output signals from the sixth and the seventh logical elements 710 and 720, and outputting '0' when the input signals are '0'. Here, the output from the third logical element 780 becomes the TRUE output from the asynchronous double line method XOR circuit.

Here, the third logical element 610, the fourth logical element 620 and the eighth logical element 730 can be comprised of OR gates, and the fifth logical element 630, the sixth logical element 710 and the seventh logical element 720 can be comprised of AND gates. FIGS. 5B and 5C show the transistor-level design thereof.

Table 3 shows a truth table of the XOR circuit of FIG. 6A.

TABLE 3

| $A_{IN\_TRUE}$ | $B_{IN\_FALSE}$ | $A_{IN\_FALSE}$ | $B_{IN\_TRUE}$ | $OUT_{FALSE}$ | $OUT_{TRUE}$ |
|---|---|---|---|---|---|
| 0 | 1 | 1 | 0 | 1 | 0 |
| 0 | 0 | 1 | 1 | 0 | 1 |
| 1 | 1 | 0 | 0 | 0 | 1 |
| 1 | 0 | 0 | 1 | 1 | 0 |

FIG. 6B is an exemplary diagram illustrating transistor-level design of the first operation unit 60 of FIG. 6A.

As shown in FIG. 6B, the first operation unit 60 includes the seventh P type transistor P601 connected to a power supply node and driven by the first input signal A1, the eighth P type transistor P602 connected in series to the seventh P type transistor P601 and driven by the second input signal B1, the seventh N type transistor N601 connected in series to the eighth P type transistor P602 and driven by the second input signal B1, the eighth N type transistor N602 connected between the seventh N type transistor N601 and a ground node and driven by the fourth input signal B2, the ninth P type transistor P603 connected to the power supply node and driven by the third input signal A2, the tenth P type transistor P604 connected in series to the ninth P type transistor P603 and driven by the fourth input signal B2, the ninth N type transistor N603 connected in series between the tenth P type transistor P604 and the seventh N type transistor N601 and driven by the first input signal A1, the tenth N type transistor N604 connected between the ninth N type transistor N603 and the ground node and driven by the third input signal A2, and the $11^{th}$ P and N type transistors P605 and N605 driven by the voltage applied to the eighth and the tenth P type transistors P602 and P604 and connected in series between the power supply node and the ground node. The voltage applied to the output node of the $11^{th}$ P type transistor P605 becomes the final output signal.

FIG. 6C is an exemplary diagram illustrating transistor-level design of the second operation unit 70 of FIG. 6A.

As illustrated in FIG. 6C, the second operation unit 70 includes the $12^{th}$ P type transistor P701 connected to the power supply node and driven by the first input signal A1, the $13^{th}$ P type transistor P702 connected in series to the $12^{th}$ P type transistor P701 and driven by the second input signal B1, the $12^{th}$ N type transistor N701 connected in series to the $13^{th}$ P type transistor P702 and driven by the third input signal A2, the $13^{th}$ N type transistor N702 connected between the $12^{th}$ N type transistor N701 and the ground node and driven by the first input signal A1, the $14^{th}$ P type transistor P703 connected between the power supply node and the output node of the $12^{th}$ P type transistor P701 and driven by the third input signal A2, the $15^{th}$ P type transistor P704 connected in series to the $14^{th}$ P type transistor P703 and driven by the fourth input signal B2, the $14^{th}$ N type transistor N703 connected in series to the $15^{th}$ P type transistor P704 and driven by the fourth input signal B2, the $15^{th}$ N type transistor N704 connected in series between the $14^{th}$ N type transistor N703 and the ground node and driven by the second input signal B1, and the $16^{th}$ P and N type transistors P705 and N705 driven by the voltage applied to the $13^{th}$ and the $15^{th}$ P type transistors P702 and P704 and connected in series between the power supply node and the ground node. The voltage applied to the output node of the $16^{th}$ P type transistor P705 becomes the final output signal.

In the first and the second operation units 60 and 70 of FIGS. 6B and 6C, the number of the switched transistors is always identical regardless of the input signals.

For example, when '0110' are inputted as the first to the fourth input signals of FIG. 6B, the seventh P type transistor P601, the tenth P type transistor P604, the 11$^{th}$ P type transistor P605, the seventh N type transistor N601 and the tenth N type transistor N604 are turned on, and the other transistors are turned off. In addition, when '1001' are inputted as the first to the fourth input signals, the seventh P type transistor P601, the tenth P type transistor P604, the 11$^{th}$ P type transistor P605, the seventh N type transistor N601 and the tenth N type transistor N604 are turned off, and the other transistors are turned on.

On the other hand, when '0110' are inputted as the first to the fourth input signals of FIG. 6C, the 12$^{th}$ P type transistor P701, the 15$^{th}$ P type transistor P704, the 16$^{th}$ P type transistor P705, the 12$^{th}$ N type transistor N701 and the 15$^{th}$ N type transistor N704 are turned on, and the other transistors are turned off. In addition, when '1001' are inputted as the first to the fourth input signals, the 12$^{th}$ P type transistor P701, the 15$^{th}$ P type transistor P704, the 16$^{th}$ P type transistor P705, the 12$^{th}$ N type transistor N701 and the 15$^{th}$ N type transistor N704 are turned off, and the other transistors are turned on.

Figure 7:
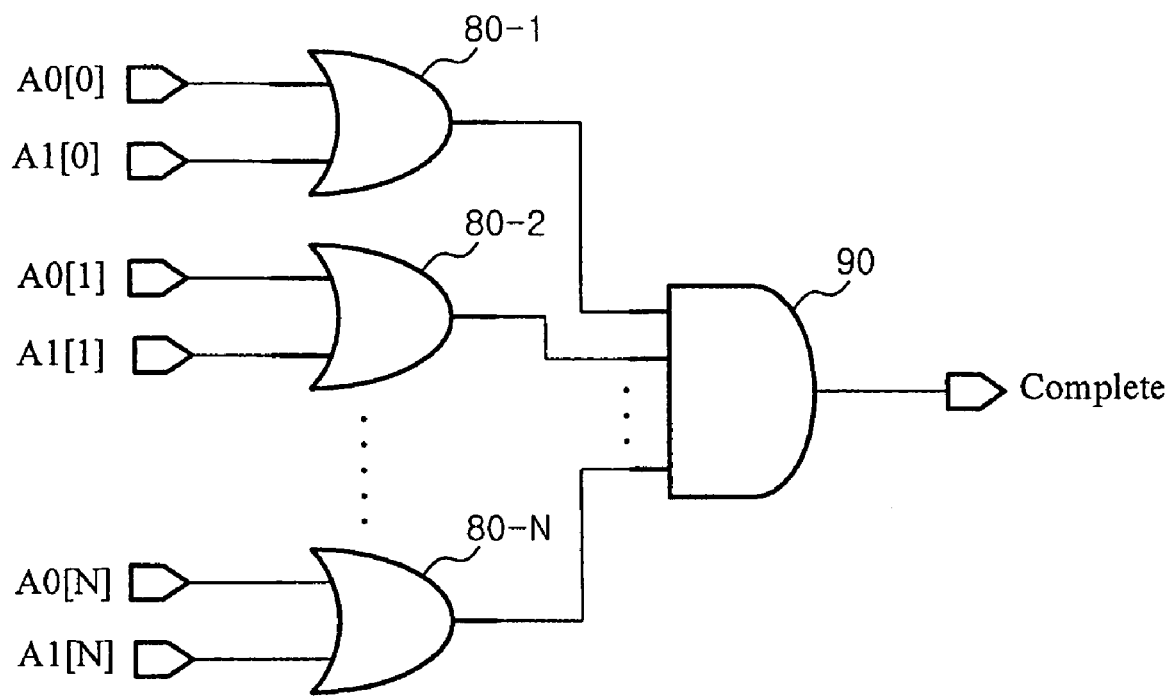
FIG. 7 is a circuit diagram illustrating a structure and operation of an operation completion sensing means in accordance with the present invention.

FIG. 7 is a circuit diagram illustrating the structure and operation of the operation completion sensing means in accordance with the present invention.

The operation completion sensing means 160 includes a plurality of the ninth logical elements 80-1 to 80-N for receiving the carry and sum from the second carry save adder 132 by repetitive multiplications, and confirming whether they are correct or not, and the tenth logical element 90 for checking validity of the whole data by integrating the resultant values of the ninth logical elements 80-1 to 80-N. Here, the ninth logical elements 80-1 to 80-N can be comprised of OR gates for outputting '0' only when the two input signals are '0', and the tenth logical element 90 can be comprised of an AND gate for outputting '1' only when all input signals are '1'. Such logical elements can be embodied as shown in FIGS. 5B and 5C.

As discussed earlier, in accordance with the present invention, the Montgomery multiplier for the RSA security module can prevent hacking by the differential power analysis attack, by minimizing power consumption difference by the input data.

Moreover, the Montgomery multiplier can compose an area-efficient circuit, by representing the data using the asynchronous double line method and minimizing the number of the used transistors.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A Montgomery multiplier circuit for providing security of information on smart cards from hacking by a differential power analysis attack, comprising:
   a first filter for receiving a first input signal and a second input signal represented by an asynchronous dual rail lines method, and selectively outputting the second input signal according to a logical value of the first input signal;
   a first carry save adder for outputting a sum and a carry of dual rail lines method by adding up a carry signal and a sum signal generated in a previous calculation procedure and an output signal from the first filter;
   a second filter for receiving a logical value of a least significant sum of the first carry save adder as a third input signal and a modular operation factor as a fourth input signal, and filtering the fourth input signal according to the third input signal;
   a second carry save adder for generating a sum and a carry of dual rail lines method, by adding up the carry and the sum from the first carry save adder and an output from the second filter;
   a carry storing unit and a sum storing unit for storing the carry and the sum from the second carry save adder, respectively;
   a carry propagation adder for calculating a final result by adding up data stored in the carry storing unit and the sum storing unit; and
   an operation completion sensor for deciding operation completion according to an output signal from the second carry save adder,
   wherein the first and second input signals are represented by the synchronous dual rail lines such that the dual rail lines represents one of the logic values for each of the first and second input signals for minimizing the difference of power consumption of the montgomery multiplier circuit.

2. The Montgomery multiplier of claim 1, wherein, when the logical values of the first input signal and the third input signal are '1', the first filter and the second filter output the second input signal and the fourth input signal, respectively, when the logical values of the first input signal and the third input signal are '0', the first filter and the second filter output logical '0', respectively, and when the logical values of the first input signal and the third input signal do not exist, the first filter and the second filter output no logical data, respectively.

3. The Montgomery multiplier of claim 1, wherein each of the first and the second filters comprises:
   a first logical element for outputting a high signal to an output true line only when a first true signal and a second true signal, which is data inputted according to the asynchronous dual rail lines method via a data true line, are a logical high; and
   a second logical element for outputting a low signal to an output false line only when the a first false signal and a second false signal, inputted via a data false line, are a logical low.

4. The Montgomery multiplier of claim 3, wherein the first logical element is an AND gate and the second logical element is an OR gate.

5. The Montgomery multiplier of claim 3, wherein the first logical element comprises:
   a first and a second P type transistors connected in parallel to a power supply node and driven by the first and the second true signals, respectively;
   a first and a second N type transistors connected in series between an output node of the first and the second P type transistors and a ground node, and driven by the first and the second true signals, respectively; and
   a third P type transistor and the a third N type transistor, driven by a voltage applied to the output node of the first and the second P type transistors, and connected in series between the power supply node and the ground node,
   wherein the voltage applied to an output node of the third P type transistor is outputted to the output true line.

6. The Montgomery multiplier of claim 3, wherein the second logical element comprises:

a fourth P type transistor connected to the power supply node and driven by the first and the second false signals;

a fifth P type transistor connected in series to the fourth P type transistor;

a fourth and a fifth N type transistors connected in parallel between the fifth P type transistor and the ground node, and driven by the first and the second false signals, respectively; and a sixth P type transistor and a sixth N type transistor driven by the voltage applied to an output node of the fifth P type transistor, and connected in series between the power supply node and the ground node, wherein the voltage applied to an output node of the sixth P type transistor is outputted to the output false line.

7. The Montgomery multiplier of claim 1, wherein the first and the second carry save adders and the carry propagation adder comprise full adders, and output the sum by performing (A XOR B) XOR C operation on the first input signal(A), the second input signal(B) and the carry signal(C), and output the carry by performing (A AND B) OR (A AND C) OR (B AND C) thereon, wherein the XOR operation circuit comprises:

a first operation unit for outputting '1' to the output false line when two pairs of binary data inputted by the asynchronous dual rail lines method, which are the first true signal and the first false signal, and the second true signal and the second false signal, are identical,; and a second operation unit for outputting '1' to the output true line when the two pairs of binary data are not identical.

8. The Montgomery multiplier of claim 7, wherein the first operation unit comprises:

a third logical element for receiving the first true signal and the second false signal, and outputting '0' only when they are logical '0';

a fourth logical element for receiving the first false signal and the second true signal, and outputting '0' only when they are logical '0'; and a fifth logical element for receiving output signals from the third and the fourth logical elements, and outputting '1' only when they are all '1'.

9. The Montgomery multiplier of claim 8, wherein the third and the fourth logical elements are OR gates and the fifth logical element is an AND gate.

10. The Montgomery multiplier of claim 7, wherein the second operation unit comprises:

a sixth logical element for receiving the first false signal and the second true signal, and outputting '1' only when they are logical '1';

a seventh logical element for receiving the first true signal and the second false signal, and outputting '1' only when they are logical '1'; and a eighth logical element for receiving output signals from the sixth and the seventh logical elements, and outputting '0' only when they are all '0'.

11. The Montgomery multiplier of claim 10, wherein the sixth and the seventh logical elements are AND gates and the eighth logical element is an OR gate.

12. The Montgomery multiplier of claim 7, wherein the first operation unit comprises:

a seventh P type transistor connected to the power supply node and driven by the first true signal;

a eighth P type transistor connected in series to the seventh P type transistor and driven by the second true signal;

a seventh N type transistor connected in series to the eighth P type transistor and driven by the second true signal;

a eighth N type transistor connected between the seventh N type transistor and the ground node and driven by the second false signal;

a ninth P type transistor connected to the power supply node and driven by the first false signal;

a tenth P type transistor connected in series to the ninth P type transistor and driven by the second false signal;

a ninth N type transistor connected in series between the tenth P type transistor and the seventh N type transistor and driven by the first true signal;

a tenth N type transistor connected between the ninth N type transistor and the ground node and driven by the first false signal; and an $11^{th}$ P and N type transistors driven by the voltage applied to the eighth and the tenth P type transistors and connected in series between the power supply node and the ground node, wherein the voltage applied to an output node of the $11^{th}$ P type transistor is outputted to the false signal line.

13. The Montgomery multiplier of claim 7, wherein the second operation unit comprises:

a $12^{th}$ P type transistor connected to the power supply node and driven by the first true signal;

a $13^{th}$ P type transistor connected in series to the $12^{th}$ P type transistor and driven by the second true signal;

a $12^{th}$ N type transistor connected in series to the $13^{th}$ P type transistor and driven by the first false signal;

a $13^{th}$ N type transistor connected between the $12^{th}$ N type transistor and the ground node and driven by the first true signal;

a $14^{th}$ P type transistor connected between the power supply node and an output node of the $12^{th}$ P type transistor and driven by the first false signal;

a $15^{th}$ P type transistor connected in series to the $14^{th}$ P type transistor and driven by the second false signal;

a $14^{th}$ N type transistor connected in series to the $15^{th}$ P type transistor and driven by the second false signal;

a $15^{th}$ N type transistor connected between the $14^{th}$ N type transistor and the ground node and driven by the second true signal; and a $16^{th}$ P and N type transistors driven by the voltage applied to the $13^{th}$ and the $15^{th}$ P type transistors and connected in series between the power supply node and the ground node, wherein the voltage applied to an output node of the $16^{th}$ P type transistor is outputted to the true signal line.

14. The Montgomery multiplier of claim 1, wherein the operation completion sensor comprises:

a plurality of ninth logical elements for sequentially receiving the carry and sum from the second carry save adder by operations, and outputting '0' only when they are '0'; and a tenth logical element for checking validity of data, by integrating resultant values of each of the plurality of ninth logical elements and outputting '1' when output values from each of the plurality of the ninth logical elements are all '1'.

15. The Montgomery multiplier of claim 14, wherein each of the plurality of ninth logical elements are OR gates and the tenth logical element is an AND gate.

* * * * *